Sept. 9, 1952   W. F. SCOTT   2,609,906
SPRING TYPE CLUTCH
Filed Dec. 28, 1948
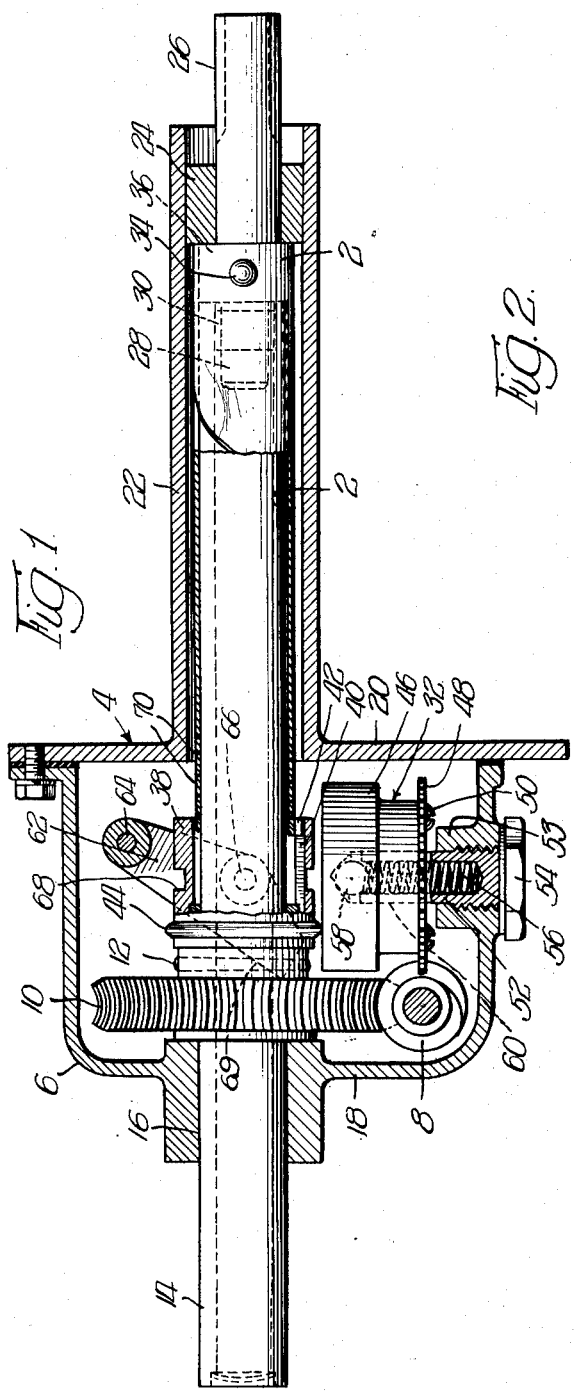
INVENTOR.
William F. Scott,
BY
Wilkinson, Huxley, Byron & Hume
Attys.

Patented Sept. 9, 1952

2,609,906

UNITED STATES PATENT OFFICE 2,609,906

SPRING TYPE CLUTCH

William F. Scott, Newton, Iowa, assignor to The Maytag Company, Newton, Iowa, a corporation of Delaware Application December 28, 1948, Serial No. 67,718

9 Claims. (Cl. 192—107)

The present invention relates to friction clutch mechanisms, and more in particular to improvements in friction clutch elements of the coil type therefor.

Among the objects of the present invention is to provide a friction clutch mechanism in which the friction clutch element therefor in the form of a coil has novel structure embodied therein to maintain an accurate and complete cylindrical clutching surface about the axis thereof throughout its entire length and upon change in the diameter of the coil, thus providing a full friction bearing of said clutching surface with its cooperating member in the clutch mechanism.

Another object of the invention is to provide novel means in the structure of a friction clutch element of the contracting coil type particularly adapted for use in friction clutch mechanism in which slippage occurs between the clutch element and a member of the clutch mechanism with which the same frictionally cooperates whereby a uniform cylindrical clutching surface for the clutch element is maintained even though the contiguous edges of adjacent coils are disposed at a relatively steep angle of inclination with respect to a plane normal to the axis of said coil.

The invention is characterized as being particularly adapted for use in friction clutch mechanisms wherein such novel means as hereinabove described is incorporated in a clutch element of the coil type in which the width of the adjacently disposed coils of said clutch element increasingly varies axially of the clutch element.

In its more particular aspect, the present invention contemplates the provision of a friction clutch element of the coil type in which one or more contiguous coils are formed with an intervening gap disposed at an angle of inclination to a plane normal to the axis of the coil with cooperating land portions disposed at an angle of inclination to said plane less than the angle of inclination of said intervening gap, although in the preferred form such coil has its land portions disposed in a plane substantially normal to the longitudinal axis thereof in order to provide a full and complete cylindrical clutch surface throughout its entire length irrespective of any change in the diameter of the friction clutch element.

Still another object of the present invention is to provide such cooperating land portions in a friction clutch element of the type in which the width of the adjacently disposed coils increasingly vary axially thereof and on the adjacently disposed coils which have the greatest lead or angle of inclination with respect to a plane normal to the axis of the friction clutch element.

Other objects, features, capabilities and advantages are comprehended by the invention, as will later appear and as are inherently possessed thereby.

Referring to the drawings:

Figure 1 is a cross-sectional view of a clutch mechanism embodying a friction clutch element constructed in accordance with the present invention;

Figure 2 is a separate view disclosing the friction clutch element embodied in the clutch mechanism in Figure 1 of the drawings; and Figure 3 is a developed view of the friction clutch element shown in Figure 2 of the drawings.

Referring now more in detail to the drawings, a friction clutch element 2 as shown in Figure 2 of the drawings and embodying improvements contemplated by the present invention is disclosed as constituting one of the elements of a clutch mechanism generally referred to as 4 in Figure 1 of the drawings. The clutch mechanism 4 includes a casing or housing 6 in which is mounted a worm 8 driven by any suitable source of power, such as an electric motor or the like, and which in turn meshes with and drives a worm gear 10. The worm gear 10 is disposed within the housing 6 and is mounted upon and fixed, by means of the pin 12 or the like, to a hollow drive shaft 14. This hollow drive shaft 14 is journaled adjacent one end in a bearing 16 formed in the side wall 18 of the housing 6, and extends into the hollow extension 22 provided with the laterally disposed wall 20 forming a part of the casing 6.

Adjacent the outer end of the hollow extension 22 is a bearing 24 in which one end of the driven shaft 26 is journaled in substantially axial alignment with the drive shaft 14, this driven shaft having a reduced end portion 28 journaled in the bearing 30 mounted within the opposite end of the hollow drive shaft 14. The shaft 26 is driven at varying speeds by the shaft 14 through a variable speed device, generally referred to as 32, and the friction clutch element 2 of the coil type which conforms to that disclosed in Figure 2 of the drawings. This friction clutch element embraces the drive shaft 14 and is connected at one end by means of a pin 34 or the like, to the enlarged collar 36 secured to the driven shaft 26. The inside diameter of the friction clutch element 2 is slightly greater than the outer diameter of the drive shaft 14 to provide sufficient clearance therebetween to prevent drag between the driving shaft 14 and the friction clutch element 2 when the same is in its uncontracted condition and ineffective to transmit torque between the driving shaft 14 and the driven shaft 26.

The variable speed device 32 is incorporated in the clutch mechanism to provide for a variable drive between the driving shaft 14 which is preferably driven at a constant speed and the driven shaft 26 through the friction clutch element 2. This variable speed device comprises a collar 38 rotatably and slidably embracing the drive shaft 14 and slidably embracing the pick-up end of the friction clutch element 2. This collar 38 is formed with a radial slot 40 extending longitudinally thereof which is adapted to receive the outwardly and radially extending end 42 of the friction clutch element 2 whereby the cooperative frictional relation between the friction clutch element 2, upon contraction on the driving shaft 14 may be controlled for driving the driven shaft 26 at varying speeds in accordance with the adjustment of the variable speed device 32.

The collar 38 is provided adjacent one end thereof with a raised peripheral wheel portion 44 adapted to frictionally contact the face of a disc member 46 which, at its other end, has a worm wheel 48 secured thereto by means of the screws 50 or the like. The worm wheel 48 meshes with and is driven by the worm 8 whereby the disc member 46 is driven at a constant speed relative to the worm gear 10. The speed of rotation of the collar 38 varies in proportion to its radial position with respect to the constantly rotated disc 46 and the speed of rotation of the driven shaft 26 and spring clutch 2 are exactly the same as the collar 38 due to the fact that they are all coupled together. When the collar 38 is rotating at any speed less than the speed of rotation of the driving member 14 it positions the free end of the spring with respect to the constant speed driving member 14 to control the amount of slippage therebetween. In this way the variable speed device is adapted to vary the cooperative frictional relation between the friction clutch element and the driving shaft 14 whereby the driven shaft 26 may be rotated at varying speeds.

The disc member 46 is drilled at 60 to slidably fit over the hollow stub shaft 52 threadedly mounted in the hub 53 of the housing 6 and held in any of its adjusted positions by means of the nut 54. The disc member is urged into cooperative frictional relation with the raised wheel portion 44 of the collar 38 by means of the coil spring 56 mounted within the hollow stub shaft 52 and bearing against the ball 58 which in turn engages the inner end of the bore 60 of the disc member 46.

The collar 38 is moved axially of the shaft 14 to move the raised wheel portion radially with respect to the face of the disc member 46 for varying the drive between the driving and driven shafts by means of a bifurcated shifter member 62 pivoted as at 64 to the casing 6 and having oppositely disposed and inwardly projecting elements 66 received within the peripheral groove or recess 68 of the collar 38. One or both arms of the shifter member may be provided with an extension 69 adapted to engage the face of the disc member 46 to move the same axially with respect to the stub shaft 52 and away from frictional engagement with the raised wheel portion 44 when the raised wheel portion is in a position opposite the axis of rotation of the disc member 46. By disconnecting the disc member 46 from the raised wheel portion 44 when the latter is in the position indicated, it is possible to readily manipulate any device which may be connected to and driven by the shaft 26.

The friction clutch element 2, as previously described in a general way, is of the coil type which operates on the principle of exponentially building up friction for the transmittal of a driving torque between a driving member and a driven member. More particularly, the friction clutch element is preferably formed to provide adjacently disposed coils 70 increasingly varying in width in an axial direction from one end thereof, which in the present illustrative example is that end which is connected to the driven shaft 26, in order to obtain a sensitive pick-up end and to provide for an increase in the cross-sectional area and the bearing surface of the coils as the load increases. This type of construction for a friction clutch element is highly desirable in a clutch mechanism of the type shown in Figure 1 of the drawings in order to provide maximum sensitivity and load carrying capacity with minimum space requirements. These advantages are obtained by virtue of the fact that each coil of the clutch element is proportioned in cross-sectional and bearing area in accordance with the amount of load which it is called upon to carry.

In a clutch element of this type, as well as in friction clutch elements in which the coils are of uniform width throughout the entire length thereof, there are certain deficiencies inherent in their structure due to the forces involved, which leads to inaccurate and inefficient bearing relation between the cylindrical clutching surface of the clutch element and its frictional cooperative driving or driven member. This will be appreciated when the forces involved are taken into consideration. As will be apparent, in friction clutch mechanisms of the type herein disclosed, the driving forces transferred by friction between the driving member and driven member are in the direction of movement of the driving surface, while the resisting forces in the clutch element are along the center of the coil surfaces at an angle to the driving forces, depending upon the coil lead or the angle at which the coil is disposed with relation to a plane perpendicular to the longitudinal axis of the coil. Under such conditions, it is clear that there will be a component of thrust from one coil to the other in an axial direction which acts to force the coils toward one another. If no gap is present between adjacent coils of the clutch element, the axial component of force, or what may be termed side thrust, between the coils having the greatest lead in the type of friction clutch element as herein disclosed, would cause these coils to be desensitized by the clamping action exerted by one coil against the other. If the proper clearance gap is provided between the coils, the gap will be closed when torque is being transmitted between the driving member and the driven member, at which time the side thrust between adjacent coils can be resisted only through internal stresses set up in the clutch element which tend to collapse the coils against each other, this resulting in a twisting or warping of the cylindrical surface of the coils away from the cooperating surface of the member with which the same frictionally cooperates in the clutch mechanism and causing conical seating therebetween.

The tendency of the coils having the greatest width to warp or twist and to cause such conical seating is characteristic of clutch mechanisms of the type which provide for slippage wherein the clutch element is wound into intermediate or semi-tightened condition as would prevail where a driven member is rotated at less speed than the speed of rotation of the driving member in contrast to clutch mechanisms in which the clutch element effects a frictional locking connection between the driving and driven members with no slippage, in which case there is less tendency for the coils of the clutch element to warp or twist. The cause of such warping or twisting of the coils of such frictional elements will be quite apparent since it is obvious that as the coil diameter changes, adjacent points on mating coils must both travel, for maximum efficiency, in a plane perpendicular to the longitudinal axis of the clutch element in order to maintain an accurate cylindrical clutching surface about that axis. In order to secure maximum efficiency of a clutch mechanism of the type herein disclosed, it is desirable to maintain full bearing of the clutching surfaces which necessitates maintaining an accurate cylindrical clutch surface about the axis of the clutch element.

The present invention is directed to an improvement in such friction clutch elements particularly adapted for use in clutch mechanisms where slippage occurs which consists in providing structure which will maintain the clutching surface of the clutch element as a true cylindrical surface during any change in the diameter thereof.

It will be apparent from an inspection of Figure 2 of the drawings disclosing the friction clutch element 2 as having coils which vary in width progressively from the end adapted to be attached to the driven shaft 26 to the opposite pick-up end which cooperates with the collar 38, that as the diameter of the same decreases when the same is contracted into frictional cooperative relation with the driving shaft 14, the adjacent coils thereof having the greatest lead or angular relation to a plane normal to the axis thereof, such as those coils of greater width, will be subjected to the greatest side or axial thrust which tends to cause uneven clutching surfaces to be formed as hereinabove explained. In order to eliminate this tendency to form conical seating between the clutch element and the driving member 14, the adjacent coils having the greatest lead are provided with gaps 72 therebetween and with cooperating stepped land portions 74 which, in the illustrative example of the invention, are disposed in planes substantially normal to the longitudinal axis of the clutch element 2. More particularly these land portions are formed to provide central parts 75 disposed in abutting relation and the overlapping ends 77 disposed in spaced relation to form gaps merging with the gaps 72. It will be clearly apparent, that with a change in diameter of the clutch element 2 due to the transmittal of a driving torque, the side thrust is absorbed in the direction of the longitudinal axis thereof and there will be no tendency to twist or warp the surfaces of adjacent coils out of the true cylindrical surface normally formed by said coils. It is desirable to provide these inter-engaging land portions between adjacent coils having the greatest lead where this tendency to deform the torque transmitting surfaces of the coils is most prevalent, it being clear that where the lead or angular relation between the adjacent coils more closely approach a plane substantially normal to the longitudinal axis of the clutch element, the need for such cooperating lands becomes less. By incorporating such lands in the clutch element, true cylindrical torque transmitting surfaces are maintained during the contraction of the friction clutch element 2 for the efficient transmittal of forces from the driving member to the driven member.

The friction clutch element 2 as shown in Figure 2 of the drawings is formed from a sheet of material developed as disclosed in Figure 3 of the drawings. In this illustrative example of the invention, a flat strip of material is cut as shown in Figure 3 to provide the stepped lands 74 and the strip or sheet coiled around a mandrel of the proper diameter whereby the finished clutch element takes the form shown in Figure 2 of the drawings in which the lands 74 are disposed in abutting relation with one another. The lands 74 are so positioned on the developed sheet or strip of material that cooperating lands between adjacent coils are provided on opposite sides of the finished clutch element at 180° with respect to one another. As illustrated in the drawings, such cooperating lands are formed only on those coils of substantial width which have a relatively large lead or angle of inclination to a plane substantially normal to the longitudinal axis of the clutch element. It is to be understood that the number and angular position of the stepped lands about the circumference of the clutch element may vary depending upon the size and diameter of the clutch and the angle of inclination of the coils thereof.

The clutch element 2 is preferably formed from flexible and resilient material to provide a clutch having the properties of a spring, although it is to be understood that the invention comprehends the provision of the described improvements in clutch elements which are flexible but non-resilient.

While I have herein described and upon the drawings shown an illustrative embodiment of the invention, it is to be understood that the invention is not limited thereto but may comprehend other constructions, arrangements of parts, details and features without departing from the spirit of the invention.

It is claimed:

1. A clutch element of the coil type comprising a member having adjacently disposed coils spaced to provide a gap between contiguous portions thereof disposed at an angle of inclination to a plane normal to the longitudinal axis of the clutch element, said adjacently disposed coils having other contiguous portions in abutting relation at all times during operation of the clutch element and disposed at an angle of inclination to a plane normal to the longitudinal axis of the clutch element less than the angle of inclination of said first named portions.

2. A clutch element of the coil type comprising a member having adjacently disposed coils varying in width in the direction of the longitudinal axis of the clutch element, certain of said adjacently disposed coils being spaced to provide a gap between contiguous portions thereof disposed at an angle of inclination to a plane normal to the longitudinal axis of the clutch element, said adjacently disposed coils having other contiguous portions in abutting relation at all times during operation of the clutch element and disposed in a plane substantially normal to the longitudinal axis of the clutch element.

3. A clutch element of the coil type comprising a member having adjacently disposed coils varying in width in the direction of the longitudinal axis of the clutch element, adjacently disposed coils of relatively greater width being spaced to provide a gap between contiguous portions thereof disposed at a relatively large angle of inclination to a plane normal to the longitudinal axis of the clutch element, said adjacently disposed coils having other contiguous portions in abutting relation at all times during operation of the clutch element and disposed at an angle of inclination to a plane normal to the longitudinal axis of the clutch element less than the angle of inclination of said first named portions.

4. A clutch element of the coil type comprising a member having adjacently disposed coils varying in width in the direction of the longitudinal axis of the clutch element, adjacently disposed coils of relatively greater width being spaced to provide a gap between contiguous portions thereof disposed at a relatively large angle of inclination to a plane normal to the longitudinal axis of the clutch element, said adjacently disposed coils having other contiguous portions in abutting relation at all times during operation of the clutch element and disposed in a plane substantially normal to the longitudinal axis of the clutch element.

5. A clutch element of the coil type comprising a member having adjacently disposed coils spaced to provide a gap between contiguous portions thereof disposed at an angle of inclination to a plane normal to the longitudinal axis of the clutch element, said gap being interrupted by at least one cooperating stepped land portion formed by contiguous portions of adjacent coils to provide central parts disposed at all times during operation of the clutch element in abutting relation at an angle of inclination to a plane normal to the longitudinal axis of the clutch element less than the angle of inclination of said first named portions and to provide overlapping ends disposed in spaced relation to form gaps merging with said first named gap to maintain a cylindrical clutching surface during operation of the clutch element.

6. A clutch element of the coil type comprising a member having adjacently disposed coils spaced to provide a gap between contiguous portions thereof disposed at an angle of inclination to a plane normal to the longitudinal axis of the clutch element, said gap being interrupted by at least one cooperating stepped land portion formed by contiguous portions of adjacent coils to provide central parts disposed at all times during operation of the clutch element in abutting relation in a plane substantially normal to the longitudinal axis of the clutch element and to provide overlapping ends disposed in spaced relation to form gaps merging with said first named gap to maintain a cylindrical clutching surface during operation of the clutch element.

7. A clutch element of the coil type comprising a member having adjacently disposed coils varying in width in the direction of the longitudinal axis of the clutch element, certain of said adjacently disposed coils of relatively greater width being spaced to provide a gap between contiguous portions thereof disposed at an angle of inclination to a plane normal to the longitudinal axis of the clutch element, said gap being interrupted by at least one cooperating stepped land portion formed by contiguous portions of adjacent coils to provide central parts disposed at all times during operation of the clutch element in abutting relation at an angle of inclination to a plane normal to the longitudinal axis of the clutch element less than the angle of inclination of said first named portions and to provide overlapping ends disposed in spaced relation to form gaps merging with said first named gap to maintain a cylindrical clutching surface during operation of the clutch element.

8. A clutch element of the coil type comprising a member having adjacently disposed coils varying in width in the direction of the longitudinal axis of the clutch element, certain of said adjacently disposed coils of relatively greater width being spaced to provide a gap between contiguous portions thereof disposed at an angle of inclination to a plane normal to the longitudinal axis of the clutch element, said gap being interrupted by at least one cooperating stepped land portion formed by contiguous portions of adjacent coils to provide central parts disposed at all times during operation of the clutch element in abutting relation in a plane substantially normal to the longitudinal axis of the clutch element and to provide overlapping ends disposed in spaced relation to form gaps merging with said first named gap to maintain a cylindrical clutching surface during operation of the clutch element.

9. A clutch element of the coil type comprising a member having adjacently disposed coils of varying lead to provide coils varying in width in the direction of the longitudinal axis of the clutch element, certain of said coils having the greatest lead being spaced to provide a gap between contiguous portions thereof disposed at an angle of inclination to a plane normal to the longitudinal axis of the clutch element, said gap being interrupted by a plurality of cooperating stepped land portions each formed by contiguous portions of adjacent coils to provide central parts disposed at all times during operation of the clutch element in abutting relation in a plane substantially normal to the longitudinal axis of the clutch element and to provide overlapping ends disposed in spaced relation to form gaps merging with said first named gap to maintain a cylindrical clutching surface during operation of the clutch element.

WILLIAM F. SCOTT.

REFERENCES CITED

The following references are of record in the file of this patent:

UNITED STATES PATENTS

| Number | Name | Date |
|---|---|---|
| 1,429,580 | Geiger | Sept. 19, 1922 |
| 1,932,000 | Starkey | Oct. 24, 1933 |
| 2,001,856 | Thompson | May 31, 1935 |
| 2,459,972 | Starkey | Jan. 25, 1949 |
| 2,515,365 | Zuhlin | July 18, 1950 |